Feb. 25, 1958 W. V. JOHNSON ET AL 2,825,020

AUTOMATIC TIMING STATION SELECTORS FOR RADIO AND TELEVISION RECEPTION, AND THE LIKE

Filed Nov. 3, 1953 4 Sheets-Sheet 1

Inventors:
William V. Johnson &
Thomas A. Banning, Jr.,
by [signature] Atty.

Feb. 25, 1958 W. V. JOHNSON ET AL 2,825,020

AUTOMATIC TIMING STATION SELECTORS FOR RADIO AND TELEVISION RECEPTION, AND THE LIKE

Filed Nov. 3, 1953 4 Sheets-Sheet 2

Inventors:
William V. Johnson &
Thomas A. Banning, Jr.,
by Thos. A. Banning, Jr.
Atty.

Inventors:
William V. Johnson & Thomas A. Banning, Jr.
by Thos. A. Banning Atty.

Feb. 25, 1958 W. V. JOHNSON ET AL 2,825,020

AUTOMATIC TIMING STATION SELECTORS FOR RADIO AND TELEVISION RECEPTION, AND THE LIKE

Filed Nov. 3, 1953 4 Sheets-Sheet 4

Inventors:
William V. Johnson &
Thomas A. Banning, Jr.
by Thos. A. Banning, Jr.
Atty.

United States Patent Office 2,825,020
Patented Feb. 25, 1958

2,825,020

AUTOMATIC TIMING STATION SELECTORS FOR RADIO AND TELEVISION RECEPTION AND THE LIKE

William V. Johnson and Thomas A. Banning, Jr., Chicago, Ill.

Application November 3, 1953, Serial No. 390,004

8 Claims. (Cl. 318—467)

This invention relates to improvements in automatic timing station selectors, and the like. The invention concerns devices of the foregoing type having a wide field of usefulness, especially in the pre-selecting of station programs which are to be automatically tuned at various times during the day, or during a time cycle. The following introductory statement will facilitate an understanding of various features of the present invention:

Time selectors for radio reception and like uses have been well known and widely used, and are at the present time in very extensive use in the United States. These devices include clock or time controlled switching means which is settable to close the circuit or bring in a selected station at a preselected time, or to turn on and off a selected radio station at various successive times of the day. Such devices are, however, limited in their application and usefulness to the switching on and/or off of a single tuned station for which the receiver shall have been set and tuned by the user. In other words, such devices as heretofore known comprise merely time-switches which perform their usual time switching functions but do not select the specific radio or television stations which are to be brought into service at the various times of the day. Thus such presently known devices are of very limited function and usefulness.

It is a prime feature and object of the present invention to provide means whereby, at various selected times of the day, and according to a pre-selected plan or program, various stations may be automatically tuned and brought into service, including the necessary switching on and off of the selected stations or the receiver as a whole to meet the current requirements from time to time. Specifically, it is a feature and object of the invention to provide means corresponding to various successive times of the day whereby at the beginning of each "program interval"—for example, each fifteen or thirty minutes during the day (of either twelve or twenty-four hours)—a pre-selected program will be tuned, and also, if the current has not been previously turned on, to also turn on the current and bring the receiver into operation, at the station in question and pre-selected for such interval of program. It is then a further feature and object to provide means whereby, when such program interval has elapsed, the device will automatically tune to some other (or the same) pre-selected station, so that during such succeeding program interval such other station will be brought and held in service. Then, when such second program interval has elapsed, the device will automatically tune another (or the same) pre-selected station, and thus the various programs which are pre-selected for a long interval of time will be successively brought into and cut out of service. We have made provision for operation through a series of programs extending over such total time interval as may be desired. Usually twelve hours of operation will suffice, but we have made provision for twenty-four hours of operation if desired. Thus, we have made provision for successively bringing in programs extending over the full twenty-four hour interval.

The number of stations "on the air" at any given time of the day, and which may be received with satisfactory clarity and strength by a given receiver will depend not only on the receiver itself, but also on the location where it is in use. Usually, as in the metropolitan areas, a number of stations are regularly receivable on almost any presently available commercial type of receiver. When the receiver is one in which the tuning is "continuous," that is, produced by variation of a variable impedance as by shaft rotation of one of the impedance elements, it is evident that the limit as to the number of stations which may be brought in is imposed by the reception qualities of the receiver, since successive stations are tuned at successive rotated positions of such shaft. When, however, the receiver is of the "push-button" type, wherein each station is tuned by closing an oscillator element of fixed quantities, it is evident that the number of receivable stations is limited by the number of fixed frequencies of oscillation for which provision has been made; unless, as is sometimes the case, there is also made provision for continuous tuning in such push-button type receiver.

In order to be able to pre-select what station is to be tuned for each of a large number of program intervals during a cycle of, say twelve hours, it is evident that switching elements must be provided, in number equal to the number of selective stations multiplied by the number of program intervals. Thus, if the number of selective stations is four, for example, and the program intervals are of fifteen minute durations, and the cycle covers twelve hours, it is evident that there are forty-eight time intervals to be provided for, and a possible selection of any of four stations at each such time interval. Thus, a total of 192 combinations must be provided for.

For a tunable time cycle of specified duration, such as twelve hours, the number of possible station selections is a direct function of the number of stations from which the selections may be made. Usually the number of "favorite" stations which are regularly tuned at any much used receiver will not exceed four, irrespective of how many stations are actually receivable on such receiver. Furthermore, in setting up a preselected program on a device embodying the features of our present invention, the individual stations which it will be desired to include in such daily program will not exceed four or five. Accordingly, we have made provision for making the program selection among four or five stations, with ability to select which of these stations, if any, shall be brought in at each program interval during the daily cycle.

In connection with the foregoing, we have also made provision enabling the operator of the device to select, from the total receivable stations, those four or five (or other number for which the device has been designed and built), which stations shall be automatically receivable and tunable at the various program intervals included in the cycle. Thus, if the receiver, and the location, were such that seven or eight stations were regularly receivable, the user could select, by use of the devices herein to be disclosed, which four or five of such total receivable stations should be included within the program to be "set up." Another day, or another time, he might decide to include within such four or five receivable and tunable stations, others which had not been included in a previously selected daily program. Thus, the present disclosures include means to select which stations shall be included within the program, as well as the time intervals when each of such selected stations shall be brought into resonance.

It is a feature and object of the present invention to make provision for selection of those four or five stations which shall be included within the program cycle, and for enabling the user to change such selections very quickly and simply, from time to time according to his desires; and to combine with such "station" selecting means, additional means to enable the user to select which of these so-selected stations shall be brought into operation and tuning at each of the successive time intervals included within the program cycle.

In connection with the foregoing, it is a further feature and object of the invention to provide very simple switching means for effecting the foregoing pre-selections. In this connection we have disclosed such switching means in various forms, including, plugging, rotative, sliding, etc.

Usually the exact tuning position of the tuning shaft for each receivable station is known, or is readily determinable by test of the receiver when placed in service. This is especially true of the larger and better controlled broadcasting stations, whose frequencies are not allowed to "wander" more than very small amounts of frequency. Accordingly, it is possible to design and build and assemble the present devices to a close tolerance, and to make "shop" adjustments corresponding to those several frequencies which may be specified, or which may be selected for inclusion within the programs. However, we have also included within our present disclosures means to enable the user himself to quickly adjust the present device to exact tuning positions for those stations which he may elect to include within his programs; and we have made this adjustment device of very simple and readily adjusted form and construction.

In connection with the foregoing the following remarks are here in order and pertinent:

We have provided means, in the form of a servo-motor element, for moving the tuning shaft or elements from one position of tuning to another as called for by the selected program. In this connection we have also provided means to arrest the tuning movement when such tuning shaft or elements reach that station position which is called for by the time program setting then in operation. The signals required to be given for discontinuing the tuning movement at the selected tuning position, as determined by the programming, must function through proper translating devices. In order that exact tuning shall be produced for each selected station during these time controlled changes, we have made provision such that during each tuning operation the next station to be tuned shall be approached from the same direction of tune; thus, the device may be designed and built in such form that tuning is effected by lowering the frequencies (from the highest tunable position) or by raising the frequencies (from the lowest tunable position). By this means we have made provision for ensuring exact tuning regardless of whether the succeeding station of the program is a higher or a lower frequency station compared to the previous station.

In connection with the foregoing feature we have also made provision for adjustability of the tuning contacts by which the signals are given, so as to enable close adjustments of the positions of these contacts to be made, either as shop adjustments, or in the home or other place of use of the device. This adjustability feature is also usable for making the necessary selection of those four or five stations which are to be included within the programs to be set up.

We have also made provision whereby the receiver may be manually tuned to any desired station, either during the continuance of the pre-selected program or independently of such program. When such a manual tuning operation has been made, the automatic pre-selected tuning may resume its functioning at the next time interval for which pre-selection has been made, so that such manual tuning operation has been effected as a temporary modification of the pre-selected program but without destroying the effectiveness and correctness of such pre-selection as affects subsequent tuning operations to be automatically made.

When it is desired to provide for twenty-four hour cyclic programming, this result may be secured either by use of a timing element operating through a twenty-four hour cycle or by use of a timing element operating on the usual twelve hour cycle, but with special provision for effecting the desired programming during the second twelve hour interval. We have herein disclosed both forms of device.

When the twenty-four hour programming is provided for, with provision for the programming during the second twelve hour interval, it is evident that the cycle of tuning operations during the second twelve hour interval will be a repetition of the cycle during the first twelve hour interval, in the absence of special provision to enable different programming operations during the two twelve hour cycles. We have made provision for such change of programming during the second twelve hour interval, when the twenty-four hour operation is secured by use of the conventional type of twelve hour clock device.

It is evident that when a twenty-four hour operation is to be secured by use of the twelve hour time cycle, with repetition of the time cycle during the second twelve hour interval, it is necessary to make provision for switching to a second series of time contacts during the second twelve hour interval, as otherwise the programming during the second twelve hour interval would be merely a repetition of the first twelve hour's program. We have made such provision in the present disclosures. In this connection we have provided a very simple but positive form of such switching device, and one which is operated solely by the movement of the time driven element itself, at the proper time during the cycle of operations.

In the drawings:

Figures 1, 2 and 3 are designed for twelve hour operation, as is evident from examination of the faces shown in these figures;

Figure 1:
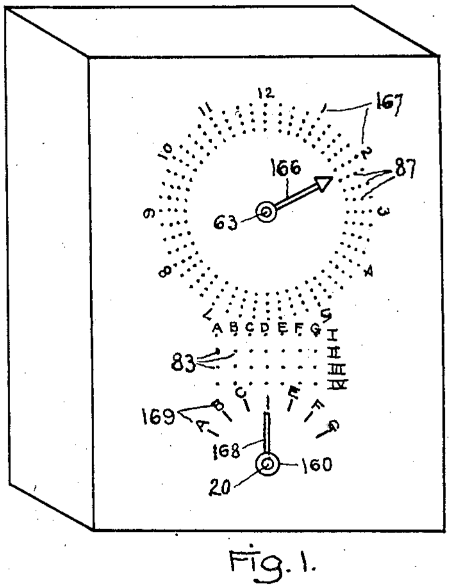
Figure 1 shows in simple outline a typical device embodying the features of our present invention, and in which device the switching means by which the station selections are made, and by which the time programming is effected, comprise small plugs which can be drawn out or pushed back, with provision for various combinations of the plug positions of the various plugs.
Figure 2:
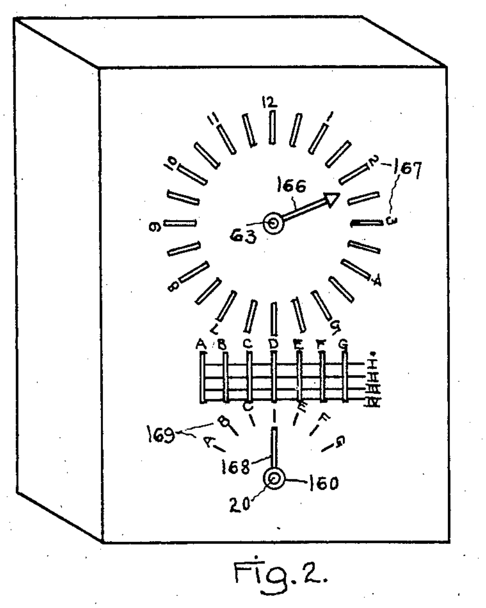
Figure 2 shows a view similar to that of Figure 1, but in this case the switching means comprise simple slide switches working through narrow slots of the front face of the device.
Figure 3:
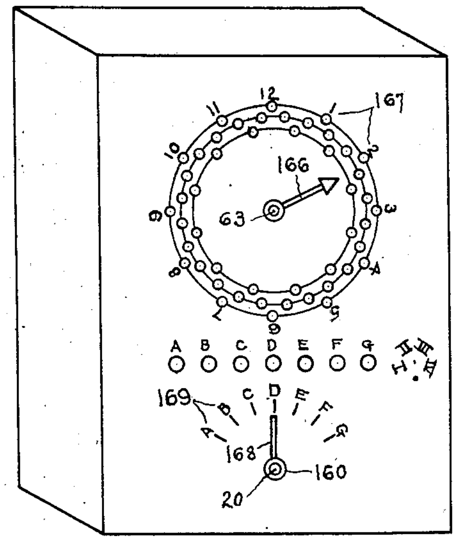
Figure 3 shows a view similar to those of Figures 1 and 2, but in this case the switching means comprise simple rotary switch elements mounted for rotary movement within the device to the desired switching positions.
Figure 4:
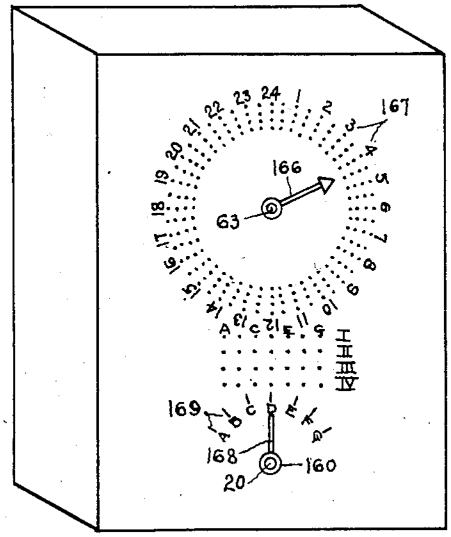
Figure 4 shows a view similar to those of Figures 1, 2 and 3, but in the present case provision is made for twenty-four hour operation according to "Continental" practice; and in the present arrangement the switching means comprises small plugs similar to the arrangement shown in Figure 1.
Figure 5:
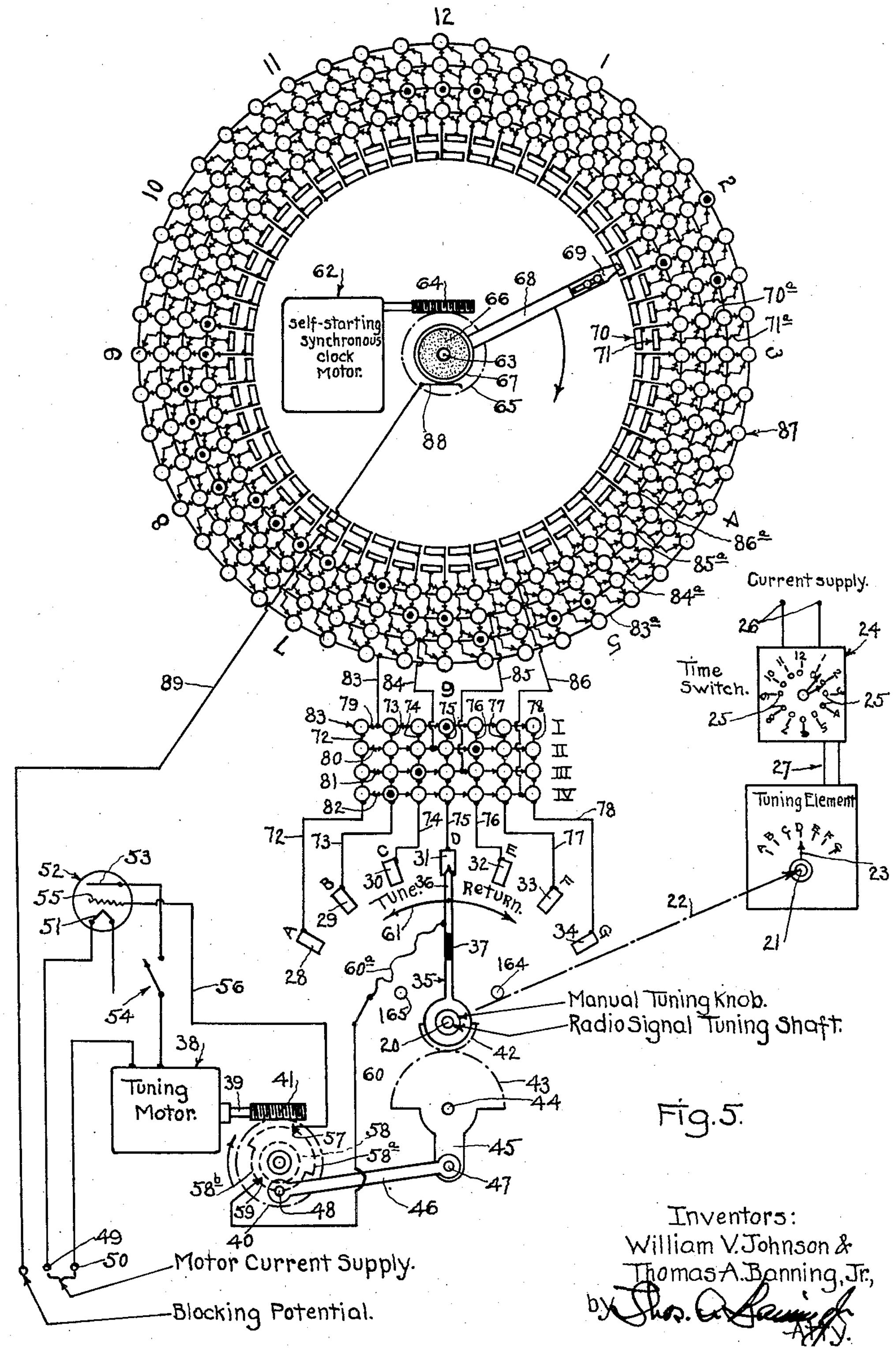
Figures 6, 7, 8, 9, 10, 11:
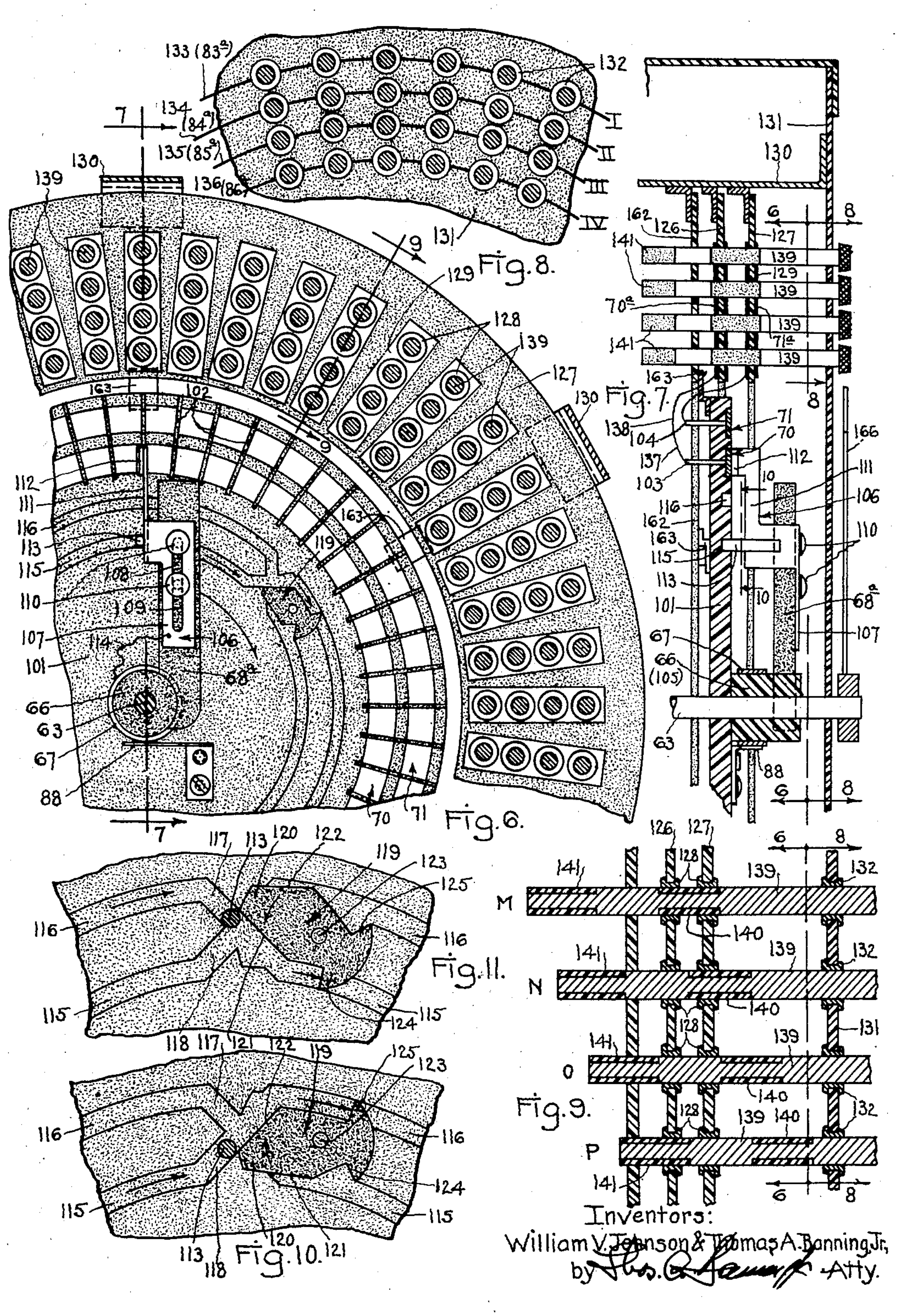
Figure 12:
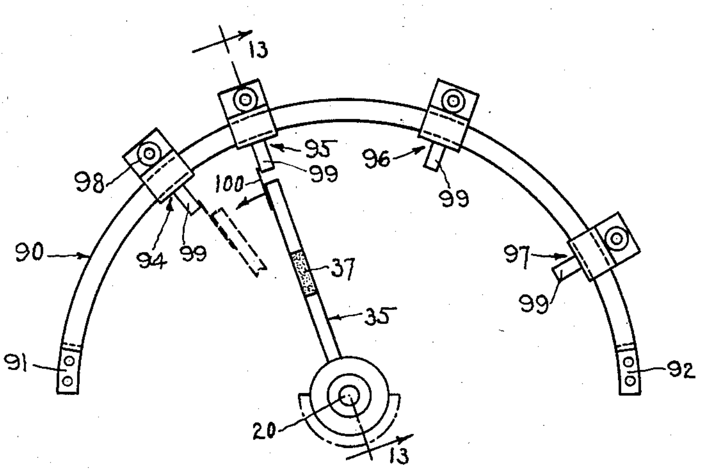
Figure 13:
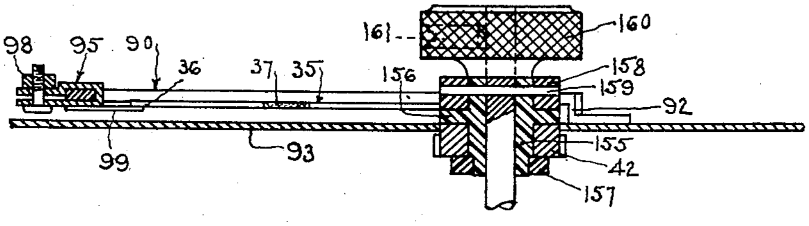
Figure 14:
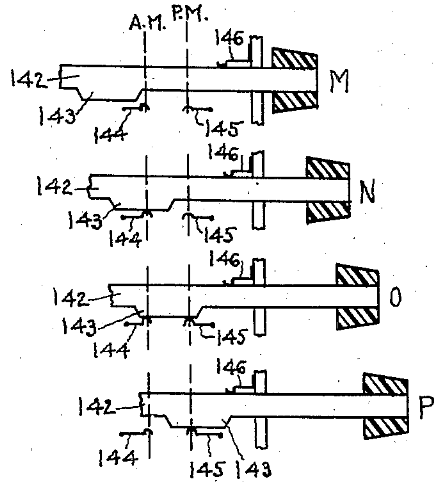
Figure 16:
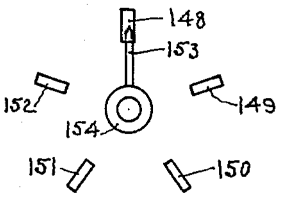
Figure 15:
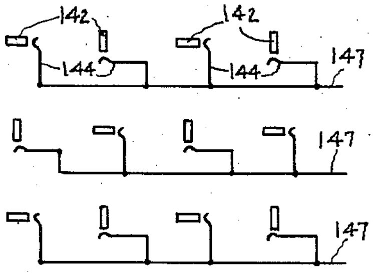

Figure 5 shows a schematic wiring diagram and layout of elements embodying the features of the present invention, in which provision is made for twelve hour operation together with provision for a second twelve hour operation to complete the twenty-four hour cycle and with provision for automatically switching at conclusion of the first twelve hours' interval, to condition for operation during the second twelve hours' interval; and in this showing provision has been made for time selection of any one of four stations at each time position of the programming; and provision is also shown for selection of four of seven stations which are frequently tuned; and in this figure there is also shown provision in the form of a time-switch unit for cutting the receiver into and out of service by turning on and off the current supply thereof at pre-selected time position; and in this figure provision is shown for physically moving the tuning shaft by a small motor, acting through suitable gear and link connections to the tuning shaft element, and with electronic means to control the running and the stopping of such motor;

Figure 6 shows schematically a portion of a contact carrying plate or group of elements, whereby there are produced electrical control impulses for determining the selection of the stations to be tuned, at successive time increments; and in this arrangement there is shown provision for twenty-four hour operation, by repetition of the two twelve hour cycles of the time element, but with change of the selector contacts at conclusion of each such twelve hour interval; and this figure may be considered as a section taken on the lines 6—6 of Figures 7 and 9, looking in the directions of the arrows;

Figure 7 is a cross-section taken on the line 7—7 of Figure 6, looking in the direction of the arrows; and this figure shows some of the details of the twelve hour switch element; and in this figure there are shown the station selector switches in the form of endwise movable plug elements;

Figure 8 shows a fragmentary section taken on the lines 8—8 of Figures 7 and 9, looking in the directions of the arrows;

Figure 9 shows a fragmentary cross-section taken on the line 9—9 of Figure 6, looking in the direction of the arrows but on enlarged scale;

Figure 10 shows a fragmentary face view of that portion of the time contact plate which includes the switch by which the time contact is shifted every twelve hours to cause alternate contact engagement with the two sets of contacts for the two twelve hour intervals, the switch element being shown in position to cause shift from the inner (smaller) radius position to the outer (larger) radius position; this figure being on enlarged scale as compared to Figure 6;

Figure 11 shows another fragmentary face view similar to that of Figure 10, but with the switch element in its reversed position, to cause shift from the outer radius position to the inner radius position;

Figure 12 shows more or less schematically a simple form of support for the contacts by which the motor is electronically controlled to stop its operation at a tuning position, and with provision whereby these contacts may be readily adjusted to ensure exact tuning at each so-stopped position;

Figure 13 shows a cross-section taken on the line 13—13 of Figure 12, looking in the direction of the arrows, but on enlarged scale as compared to Figure 12;

Figure 14 shows four positions (A, B, C and D) of one of the endwise movable switching elements which may be used in place of the plugs schematically indicated in Figures 1 and 4; and in this figure, position "A" shows the "Off" position, position "B" shows the position for "A.M." operation, position "C" shows the position for "A.M. and P.M." operation, and position "D" shows the position for "P.M." operation;

Figure 15 shows more or less schematically a simple arrangement of the relationships of the four switching elements of the type shown in Figure 14, showing three sets of such elements in their relationship to each other; and Figure 16 shows more or less schematically one of the switching elements of rotatable form, and provided with an "Off" position, and four station selector positions.

We shall first refer to Figure 5 which shows more or less schematically the layout of elements capable of producing various of the functions previously stated herein. In this figure the numeral 20 designates a shaft or movable element whose position corresponds to the tuning position of the tuning shaft or other tuning element of the receiver. At this point we mention that the features of the present invention may be incorporated into a receiver at the time of its construction, and as a portion of the original design thereof, or may be incorporated into a separate unit intended for attachment to receivers themselves for automatic control of such receivers. In the showing of Figure 5 we have shown the principal elements of the present improvements, and their relationship to the tuning shaft of a receiver; and it will be understood that our present features may be used and built into the receivers themselves, or may be provided as separate automatic units for attachment to separate receivers.

The shaft 20 is to be rocked back and forth to the proper tuning positions to bring in the selected stations, and by such rocking to also correspondingly rock the tuning shaft of the receiver elements, which receiver shaft is usually connected to the proper variable impedances and other tuning elements in conventional manner. In Figure 5 we have shown the tuning shaft of the receiver itself at 21, and have indicated the operative connections from the shaft 20 to the shaft 21 by the broken line 22. It will now be understood that the control shaft 20 may be either a separate shaft of the control unit, connected to the tuning shaft of the receiver, or may be a continuation of the receiver's tuning shaft, or built into the receiver itself as a portion of the complete receiver unit.

In Figure 5 we have indicated the tuning positions for seven stations, "A," "B," "C," "D," "E," "F" and "G," and the pointer or other indicator 23 showing which of said stations is at the moment being tuned. We have also, in Figure 5, shown a time-controlled switch unit 24, having various time positions, 25, at which settings may be made for turning on and off the current supplied through such time-controlled unit; and we have indicated the current supply terminals 26 leading into such unit 24, and the current delivery terminals and connections, 27, extending from such time-controlled unit to the receiver, for supply of current to such receiver, and for turning such current on and off at pre-selected times of the day. Sometimes such time-controlled units are built directly into the receivers and constitute portions of them. But it is here emphasized such time-controlled units serve only to turn on and off the current supply to the receiver, and do not perform any station selecting and/or tuning function. It is thus necessary, even when using such a time-controlled unit as just referred to, to pre-set and pre-tune the receiver to the station which it is desired shall be operative when the current is actually turned on. Our present improvements serve to perform the actual tuning operations to pre-selected stations at selected times of the day, and according to any pre-selected programming.

The station selecting and tuning element or uint includes the contact elements 28, 29, 30, 31, 32, 33 and 34, corresponding to the several tuning positions of stations "A," "B," etc., shown in the receiver unit, so that by rocking the shaft 20 the angular positions of both shafts 20 and 21 are always in synchronism, back and forth. The shaft 20 carries the arm 35 to which is connected the movable contact 36, insulated from the remainder of the arm 35 by the insulating block 37. Thus the contact 36 is always in step and synchronism with the tuned position of the receiver unit. This contact 36 successively engages the station selecting contacts 28 to 34, inclusive, during a complete swing of the shaft 20 and the arm 35 in the clockwise direction, and engages said contacts in reverse order during the succeeding counterclockwise swing of the arm 35. For reasons which will presently become apparent it is desirable that the tuning functions shall always be effected by approach of the contact 36 from the same direction (for example, from the right, as during a counter-clockwise swing of the arm 35); and in Figure 5 we have designated the directions of movement of the arm 35 as "Tune" for the counter-clockwise rock, and "Return" for the clockwise rock of the arm.

The shaft 20 may be rocked back and forth by servo-motor control as follows:

We provide the small motor 38 which may be either a single direction motor (as shown in Figure 5) or a reversible motor. The shaft 39 of this motor drives a worm gear 40 by the worm 41 carried by the motor shaft; and by proper selection of motor speed and gear ratio the rotational rate of the worm may be that rate which will ensure a complete swing of the arm 35, back and forth, within such relatively small time interval as is determined upon in the design. For example, a complete back and forth swing in two or three seconds might be satisfactory. A circular rack 42 is connected to the shaft 20 (through a friction drive, for reasons which will presently be explained). This rack conveniently extends through about one-half of a revolution, as shown in Figure 5. A companion segmental gear element 43 is pivoted on the axis 44 and meshes with the rack element 42; and as shown in Figure 5 this segmental gear 43 is preferably of greater diameter than the rack element 42 so that the necessary complete rock of the shaft 20 may be effected by a swing of the gear element 43 considerably less than one-half of a revolution. The desirability of this will presently become apparent. This segmental gear 43 is provided with an arm 45; and the free end of this arm 45 is connected to the worm gear 40 by the link 46 which is pivotally connected to the arm and to the gear 40 at the points 47 and 48, respectively. By properly proportioning the radii at which the pivotal points 47 and 48 are located from their respective axial centers it is possible to ensure the desired back and forth swing of the arm 45, and therefore of the contact 36 carried by the arm 35, for each complete revolution of the worm gear 40. It is now noted that by magnifying the rotational movement of the arm 35 as compared to the segmental gear 43 (which magnification is effected by the use of the larger size radius of the segmental gear than for the rack element 42), it is possible to secure the desired swings with a much reduced angularity in the connection of the link 46 to the arm, and thus a more uniform rate of rock of the arm 35 and the contact 36 will be produced.

It is desired that the contact 36 shall always occupy a position dictated by the pre-selected tuning position, and that this condition shall obtain during the entire time of the program interval duration. Also, necessarily, that as the pre-selected stations are changed from time to time during the programming, the contact 36 shall always seek out and come to stop at that one of the contacts 28 to 34, inclusive, which at the time corresponds to the station selected for tuning at that phase of the program. In other words, whenever the time-control mechanism dictates that some other station shall be brought into use, it is necessary that means be set into motion which will cause the arm 35 to swing to such position that its contact 36 shall come to rest at the position of that one of the contacts 28 to 34, inclusive, which corresponds to the newly required station tuning. Such means we have provided as follows:

A suitable current supply for the motor 38 is indicated at the terminals 49 and 50 (preferably a D. C. supply from the receiver rectifying elements). The terminal 50 is shown as connected directly to the motor 38; the other terminal 49 is shown as connected to the filament 51 of the tube 52, and the plate 53 of such tube is shown as being connected to the other motor terminal through a cut-out switch 54 so that automatic selective control may be discontinued by opening such switch. The grid 55 of the tube is connected by the line 56 to a stationary contact 57 adjacent to the worm gear element 40. The worm gear element carries a contact element 58 (insulated from the worm gear proper), which contact element 58 comprises two substantially semi-circular sections 58$^a$ (of larger radius), and 58$^b$ (of smaller radius). The stationary contact 57 is so positioned that it may engage the larger radius section 58$^a$ but will not engage the smaller radius section 58$^b$ during the rotation of the worm gear. Another stationary contact 59 is provided in position to engage the smaller radius section 58$^b$. Accordingly, as the worm gear completes one revolution the contact 59 will remain at all times in engagement with the contact section 58$^b$, but the contact 57 will make engagement with the contact 58$^a$ only during substantially one-half of such revolution of the worm gear.

The stationary contact 59 connects by a line 60 with the contact element 36 which is carried by the swinging arm 35, such line 60 including the flexible section 60$^a$ so that proper connection is retained to the contact 36 during all back and forth swings of the arm 35.

As will presently appear we have provided means whereby the contacts 28 to 34, inclusive, may be selectively electrified with a blocking bias potential sufficient to block the tube 52 and thus cut-off current flow to the motor whenever such blocking potential comes to the tube grid 55. The means presently to be disclosed is such that one of such contacts 28 to 34 is thus electrified corresponding to each time interval of the pre-selected program. At the next time interval the same of some other of such contacts 28 to 34 may be thus electrified, and so on through the program cycle. In Figure 5 the arm 35 is shown as swung into position to bring the contact 36 into engagement with the contact 31, for station "D." If it be assumed that at the time interval at which the circuit connections of Figure 5 have been there illustrated the contact 31 is being electrified at the biasing potential, then such biasing potential will be delivered over the line 60 (including the flexible section 60$^a$) contact 59, contact section 58$^b$, contact section 58$^a$, contact 57 and line 56, to the tube grid, thus blocking the tube, and discontinuing current supply to the motor 38 which will quickly come to rest, leaving the contact 36 in engagement with the station contact 31 just referred to. Then, if at completion of the time interval for which such tuning effect was produced, such station contact 31 be de-electrified and another one of the contacts 28 to 34, inclusive, be electrified with the biasing potential, the blocking of the tube grid will stop (with de-electrification of the contact 31) and current will flow through the motor, bringing it into operation and causing the arm to be swung away from the contact 31. Such swinging of the arm 35 will be counter-clockwise (assuming that the motor drives the worm gear 40 in clockwise direction as shown by the arrow in Figure 5). Thus the contact 36 will be moved away from the contact 31 and progressively into engagement with the contacts 30 and 29 which lie to the left of the previous position of the contact 36. If, then, the contact 29 shall have been electrified with the biasing potential immediately after discontinuing such electrification of the contact 31, the arm 36 will swing over the contact 30, but since that contact has not been electrified no stopping effect on the motor will occur, and the drive of the arm 35 and contact 36 towards the left will continue until the contact 36 comes into engagement with the station contact 29, which it has been assumed above, is now electrified with the biasing potential. Immediately that contact 36 engages contact 29 the grid will be biased to block the tube 52, and supply of current to the motor will cease, and the parts will come to rest with the arm 35 in the position dictated by such engagement of the contact 36 with the contact 29.

If we next assume that upon completion of this time interval of the programming, just referred to, the next one of the station contacts to be electrified is the contact 32, it is seen that an additional operation feature must come into play as follows: The discontinuance of electrification of the contact 29 will terminate the blocking of the tube, and will institute supply of current to the motor. But that motor will again rotate in the same direction as before. Thus, although the newly electrified station contact is number 32, the motor drive will first cause the arm 35 (and contact 36) to move counterclockwise (towards the left), and such movement will continue until the pivotal point 48 connecting the link 46 to the worm gear passes the position of alignment of the points 48 and 47 with the worm gear's axis, whereupon reversal of link drive will occur, and the segmental gear 43 will commence to rock in the counterclockwise direction, thus rocking the arm 35 and the contact 36 in the clockwise direction. But the parts are so proportioned that such reversal of drive does not occur until the contact 36 has been carried into engagement with the station contact 28, from which engagement it promptly disengages at the commencement of the reverse drive.

During such reverse drive the contact 36 will come in succession against the contacts 29, 30 and 31, and finally it will come into engagement with the contact 32, but from the left side (the movement being now clockwise). It is thus to be seen that such engagement with the contact 32 is at the left hand side of that contact, whereas, study of the preceding operations will show that the engagement of the contact 29 was from the right-hand side thereof. Since the shaft 20 is connected to the receiver tuning shaft 21 (or comprises such shaft), it will be at once seen that under the operating conditions just above exposed, there might be and probably would, in many cases, be a serious lack of accuracy of tuning, when approaching the contacts 28 to 34 from one direction, assuming that there was perfect tuning when approaching from the other direction. We have, therefore made provision whereby the actual blocking of the tube for discontinuance of motor drive always occurs when approaching an electrified contact from the same direction of arm swing (for example, for arm swing counter-clockwise as shown in Figure 5). The arrangement is such that when coming to an electrified contact from the left-hand side (during clockwise swing of the arm 35) the tube grid is disconnected by the contact arrangements which we have provided at the worm gear location, 40, so that even upon engagement with such electrified contact (for example, 32) from the left-hand side the tube grid will not be subjected to the blocking potential, and thus the motor operation will continue. The means whereby this result is produced are as follows:

The semi-circular contact elements 58$^a$ and 58$^b$ at the position of the worm gear are so positioned angularly on that worm gear that the following effects are produced: During the clockwise swings of the segmental gear 43 (corresponding to counterclockwise swings of the arm 35 and contact 36) the large radius contact element 58$^a$ is in engagement with the stationary contact 57, thus establishing circuit connections between the tube grid and the contact 36 which is carried by the arm 35; but during the counterclockwise swings of such segmental gear 43 (corresponding to clockwise swings of the arm 35 and contact 36) the small radius contact element 58$^b$ is in non-engagement with the stationary contact 57, due to the smaller radius of such element 58$^b$. Thus, during this half of the cycle of swings the engagement of the contact 36 with an electrified one of the contacts 28 to 34 does not transmit that electrification through to the tube's grid, and thus no blocking of current supply to the motor occurs. Therefore motor operation will continue for the full rightward swing of the arm 35 and the contact 36, and during such rightward swing any electrified station contact will be passed by, and the full rightward swing will be performed without motor stopping.

When the rightward limit of such swinging operation is reached and reversal of swing begins, the large radius contact element 58$^a$ will engage the stationary contact 57, to thus establish connection between the contact 36 and the tube grid, so that when, during the leftward or counterclockwise swing of the arm 35 and contact 36 such contact comes to an electrified station contact, the tube grid will be electrified with a biasing potential, and motor operation will cease. Thus, all effective engagements of the contact 36 with station contacts, to effect receiver tuning, must occur from one and the same direction of arm swing. In the showing of Figure 5 that direction of effective engagement is from right to left, as shown by the arrow 61 in that figure. Thus, by setting the station contacts 28 to 34, inclusive, to exact tuning positions for arm swing towards the left, there will be assurance that accurate tuning will always occur.

Provision has been made whereby, at the commencement of each time interval of the selected programming that one of the contacts 28 to 34 shall be electrified with the biasing potential which contact corresponds to the station selected for tuning during such interval. To this end the following means have been provided:

We provide a suitable time-count element, such as a clockwork element, 62. Conveniently this comprises a conventional synchronous motor clock, driven from the A. C. supply, and keeping accurate time in synchronism with the broadcasting systems. This time-count element drives the shaft 63 though the medium of the worm and worm gear drive 64—65. Mounted on the shaft 63 is the insulating hub element 66 carrying the slip-ring 67; and the shaft 63 also carries or drives the radial arm 68. The radially extensible contact element 69 carried by the outer portion of this arm 68 is adapted to engage either of two sets of regularly time-spaced contacts, 70 and 71 as the shaft 63 rotates. At this point we mention that one of these sets of contacts, for example 70, is for the "A. M." station selections, and the other set of contacts, 71, is for the "P. M." station selections, and provision is made for shifting the radially extensible contact 69 either inwardly or outwardly to engage the one set or the other according to the half day then in force. The shaft 63 is driven at rate to make one revolution each twelve hours, thus corresponding to the hour shaft of a conventional time clock.

At this point we refer to the fact that provision has been disclosed for enabling the inclusion of a selected number of stations within the program which is pre-set. In the illustrated case shown in Figure 5 we have made such provision for inclusion of four stations within the program, of course a greater or a smaller number may be provided for in the device, conformably to the selected design and construction. Since we have illustrated seven stations as being tunable, being the stations "A," "B," "C," "D," "E," "F" and "G," in the showing of Figure 5, we have also made provision for selecting which of these stations shall be included within the programming of any setting of the device. Each of the contacts 28, 29, 30, 31, 32, 33 and 34 which corresponds to a busbar "A" to "G," inclusive, is connected to a corresponding vertical busbar 72, 73, 74, 75, 76, 77 or 78, as the case may be. There are also provided the horizontal busbars 79, 80, 81 and 82 which cross these vertical busbars but are insulated from them; and at each point of crossing between these vertical and horizontal busbars we provide a switching element, indicated by the small circles 83 in Figure 5. Each of these switching elements 83 is of form such that when in one switching position it will connect its horizontal and vertical busbars together, whereas when in its other position such connection is terminated.

The four horizontal busbars 79, 80, 81 and 82 are connected to the leads 83, 84, 85 and 86, respectively.

Corresponding to each of the time contacts 70 there is provided a radially extending busbar 70$^a$, and corresponding to each of the time contacts 71 there is a radially extending busbar $71^a$. As hereinafter disclosed, these busbars $70^a$ and $71^a$ are in axial alignment, so that in Figure 5 each busbar $70^a$ is actually below the corresponding busbar $71^a$, although in that figure they are shown side by side. We have also provided the four ring shaped busbars $83^a$, $84^a$, $85^a$ and $86^a$ which are in connection with the leads 83, 84, 85 and 86, respectively. These ring shaped busbars cross the locations of the radially extending busbars $70^a$ and $71^a$. At each such point of crossing we have provided switching means which can be set to either of four positions, as will be hereinafter explained. These positions are "Off," "A. M.," "A. M. and P. M.," and "P. M.," respectively. Thus, by proper settings of these switching elements it is possible to connect either or both of each of the sets of radial busbars, $70^a$—$71^a$ to any selected one of the circular busbars $83^a$, $84^a$, $85^a$ or $86^a$, and thus also to the corresponding lead 83, 84, 85 or 86, and thereby to the corresponding horizontal busbar 79, 80, 81 or 82. These switching elements between the radially extending and the circularly extending busbars are designated as 87 in Figure 5, and have shown them by the small circles.

A brush 88 engages the slip-ring 67, and to this brush there is supplied potential of blocking value over the line 89. The slip-ring 67 is connected to the contact 69 by a flexible lead, as will presently appear. Thus, as the arm 68 sweeps around the circle hour by hour the blocking potential is applied successively to the radial busbars $70^a$ during the A. M. operation, and to the radial busbars $71^a$ during the P. M. operation. Such blocking potential is then communicated to the selected one of the contacts 28 to 34, inclusive, according to the positions of the switching means 87, and the switching means 83, namely, according to the program set-up which has been established by the user.

Frequently those stations which are to be included within the programming will be of frequent use, so that it is possible to provide a device in which the several contacts 28 to 34, inclusive are of set positions. Even so, it will generally be desirable to be able to effect slight lateral adjustments of theses contacts in order to secure exact tuning operations. Additionally, it may frequently happen that the user may wish to include within his programming one or more stations other than those which he generally tunes. Therefore we have shown means of simple nature for enabling lateral adjustments of the several contacts, e. g. four in number, which are to be used. Reference is now directed to Figures 12 and 13 showing a simple construction to enable securing these desired adjustments.

In Figures 12 and 13 we have shown the circular arcuate supporting ring element 90, preferable of flat section. The ends of this element are provided with the brackets 91 and 92 which may be secured to a convenient supporting plate such as 93. Carried by this ring shaped element are the several contact elements 94, 95, 96 and 97. Each of these comprises a clip of springy material and flattened sides, which clip is set over the flat element 90, and can be laterally adjusted on said element 90 to the exact desired position. A bolt element 98 is extended through the end portions of each such clip, so that by tightening such bolt element the clip may be locked in its adjusted position. Each of these clips is then provided with the contacting projection 99 which is adapted to be engaged by a leaf contact 100 carried by the arm 68 or a projection from said arm. By this means a close adjustment of the point of engagement between the leaf contact 100 and the projection 99 of the element 94, 95, 96 or 97, may be effected. These adjustable clips may be made readily accessible through an opening of the casing of the tuning element so that changes in programming may be easily made, or adjustments of the positions of the contacts 94 to 97 may be made when needed. The element 90 is of insulating material.

Reference is now made to Figures 6 to 11, inclusive, as illustrative of some details of construction of those elements concerning the time contacts, the rotating arm 68, the switching elements, and other features already referred to in the description of Figure 5. The contacts 70 and 71 are conveniently carried by or built into a sheet of moulded plastic 101. This sheet is circular in form, and may be moulded with two conducting material rings near its periphery, but separated from each other. After such moulding operation these rings may be cut through along radial lines, shown at 102 in Figure 6, so as to separate each ring into the successive time contacts 70 and 71. The rings thus cut into the individual contacts may be originally provided with rearwardly extending pins, 103 and 104 spaced from each other correctly so that after the cutting operation each contact will be provided with an integrally formed pin which will extend out through the back or under face of the moulded element. These pins will then form suitable elements by which connections may be established to the several contacts themselves.

The shaft 63 is journalled in the plate 101, being conveniently time driven at the back side of said plate. At its frontwise projecting portion this shaft is provided with the insulating hub 105. This hub carries the slip ring 67 already referred to. The arm element $68^a$ of insulating material, such as plastic may be moulded directly to the hub 105. As shown in Figure 6 this arm is conveniently formed to one side of a radial line, that is, tangent to a circle drawn about the axis of rotation and of diameter approximately the same as the diameter of the hub element 105. A sheet metal contact element 106 is provided and slidably supported by the outer end portion of the arm element $68^a$. This contact element includes the flat portion 107 lying on the top face of the arm $68^a$, and provided with the slotted openings 108 and 109 (both of which may be merged together); and the headed studs 110 are carried by the arm element $68^a$ and extended through such slotted openings, to guide the contact element in its radial movements and to limit such movements if necessary. The contact element also includes the right-angularly formed side portion 111 which extends outwardly along the side of the arm $68^a$ and whose lower and free end portion is provided with the brush or slide contact 112 which rides over the contacts of the series 70 or 71, as the case may be. In Figures 6 and 7 the contact element is shown in its small radius position where the brush 112 is riding on the contacts 70. A pin 113 is secured to the portion 111 and reaches down far enough to ride within certain guide grooves formed in the surface of the plate 101, as will presently appear in detail. This pin serves to shift the contact element 106 bodily inwardly and outwardly radially of the arm $68^a$, at the conclusion of the twelve hour intervals, so as to cause the brush 112 to ride on the contacts of the set 70 or the set 71, as required for such twelve hour intervals.

A flexible lead 114 connects the slip-ring 67 with the contact element 106 as shown in Figure 6.

The circular grooves 115 and 116 are formed in the face of the sheet 101. These are of radii differing from each other by an amount substantially the same as the difference, radially, between the centers of the contacts 70 and 71. The pin 113 rides in first one, and then the other, of these two grooves. At a cross-over point we have provided the crossing groove sections 117 and 118 which establish connection from the terminal end of the outer groove to the beginning end of the inner groove, and from the terminal end of the inner groove to the beginning end of the outer groove, respectively. The pin 113 is of size to substantially fill each groove in which it is riding, so as to ensure good control of the pin during its circular travels. It will be evident, however, that when passing from the terminal portion of each groove to the beginning portion of the other groove, such control is lost, at least in part, and there is danger that the pin may either jam or may return to the groove from which it is intended to depart. Accordingly, we have provided the switching element 119 at the cross-over location to ensure proper delivery of the pin every time to that groove to which it should travel. This switching element includes the switch point 120, having the opposite pin engaging faces 121 and 122 of such form that the one or the other of these faces will always constitute a continuation of the working face of the trackway formed by the groove, for ensuring proper transfer of the pin from the one groove to the other. Figures 10 and 11 show the two positions of this switch element for the two conditions of pin transfer.

This switch element is accommodated within a socket moulded in the face of the sheet 101; and conveniently a pivot pin 123 is provided, carried by the sheet 101, and pivoting the switch element. The switch element is provided, rearwardly of the pivotal point, with the laterally extending fingers 124 and 125 which extend across the entering portion of that groove into which the pin shall be delivered during each switching operation so that such finger will be engaged by the oncoming pin and be thrust to one side. Thus, in Figure 10 the finger 125 is in position to be engaged by the pin as it enters the outer groove, and as the pin then travels along such outer groove it must press against this finger in order to clear the passage for the continued pin travel. This will rock the switching element to the opposite position, shown in Figure 11, preparatory to a correct switching operation slightly less than twelve hours later. At that subsequent switching operation a reverse operation will occur, etc. Thus, each twelve hours the contact element 106 will be shifted either inwardly or outwardly on the arm 68$^a$, so as to change the engagement of the contact element 112 from the one set of contacts 70 or 71 to the other set.

We have provided two circular or ring shaped supports, 126 and 127, of insulating material such as plastic, preferably of slightly larger diameter than the sheet 101; and located in successive planes lying forwardly of the sheet 101, as well shown in Figure 7. The sheet 126 may be designated the A. M. sheet and the sheet 127 the P. M. sheet, for convenience. In Figure 6 the sheet 127 is shown, and this showing is also typical of sheet 126. Each sheet carries a group of conducting thimbles or the like 128, corresponding to each of the contacts 70 or 71, as the case may be; and the thimbles of each such group are located preferably in radial alignment as shown in Figure 6. Each such group includes a number of thimbles equal to the number of the stations which may be included in any selected program; and in the present instance each such group therefore includes four thimbles. The thimbles of each such group are connected together by a radial conductor, 129. In the showing of Figures 6 and 7 these radial conductors are in the form of thin strips of metal, slightly wider than the thimble diameters, so that in production the thimbles may be set through holes formed in the sheets 126 or 127, and through holes formed in the strips 129, and may then be riveted securely in position. Thus all four of the thimbles of each group are connected electrically together. The circular sheets 126 and 127 are supported by brackets 130 secured to the housing 131; and both of the sheets 126 and 127 are set in such positions that each radial group of thimbles of one sheet registers axially with a corresponding group of thimbles of the other sheet. The housing element 131 is also provided with groups of thimbles registering with these groups carried by the sheets 126 and 127, and these are also in axial alignment with the respective groups of the circular sheets. Accordingly, each of the housing thimbles, 132, aligns axially with a thimble of each of the two groups beneath it, thus bringing three thimbles into each such alignment.

Examination of Figure 8 also shows that the thimbles of the housing element are located in circular locations, four in number corresponding to the four stations which may be selected for any program. Then, too, circular conductors 133, 134, 135 and 136 are provided on this housing element, electrically connecting the thimbles of each circular group together. The radial conductors 129 of the two circular sheets correspond to the radial conductors 70$^a$ and 71$^a$ shown in Figure 5; and the circular conductors shown in Figure 8 are the circular conductors 83$^a$, 84$^a$, 85$^a$ and 86$^a$ shown in Figure 5. Each of the pins which extends from a contact 70 is individually connected to one of the radial conductors 129 of the sheet 126 by a lead 137, and each of the pins which extends from a contact 71 is individually connected to one of the radial conductors 129 of the sheet 127 by a lead 138. Accordingly, as the contact 112 carried by the arm 68$^a$ engages each of the contacts 70, the thimbles of one group are electrified, and likewise when, twelve hours later, such contact 112 engages each of the contacts 71, the thimbles of one group are electrified, such group being in axial alignment with the just previously mentioned group. Thus as the shaft 63 rotates through a twelve hour semi-cycle the successive radial groups of the sheet 126 are electrified, and then during the succeeding twelve hour interval the successive radial groups of the sheet 127 are electrified, etc.

We have provided switching means to selectively connect each radial conductor to a pre-selected one of the circular conductors, thus also selectively connecting the radial conductors to the contacts which are engaged by the contact 36 of the swinging arm 35. Reference is first made to the embodiment shown in Figures 6, 7, and 9. In this embodiment each switching device includes a longitudinally movable plug element in the form of a rod 139 extending through the thimbles of the two sheets 126 and 127, and through the thimble of the sheet 131, said last named thimbles being designed by the numeral 132. Each of the plugs 139 is of conducting material, but is provided with the encircling rings 140 and 141 of insulating material such as plastic. In Figure 9 we have shown four of these switching elements, one above the other. The top such element is shown in its "Off" position, the next lower element is shown in its "A. M." position, the next lower element is shown in its "A. M. and P. M." position, and the lowermost element is shown in its "P. M." position. It is understood that the metal plug 139 is at all times in engagement with the thimble 132 carried by the sheet 131, which thimbles are connected together by the circular conductors 83$^a$, 84$^a$, 85$^a$ or 86$^a$. Study of the connections established by the device of Figure 9 will show that in the plug position "M" of Figure 9 both of the thimbles carried by the plates 126 and 127 are disconnected from the circular conductor; that in the next lower position, "N" of Figure 9, the plug is connected to the thimble of the plate 126, being an "A. M." thimble, so that for "A. M." operation said thimble is connected to the circular conductor; that in the next lower position "O" of Figure 9, the plug is connected to the thimbles of both of the plates 126 and 127, and thus for both "A. M." and "P. M." operation; and that in the lowermost position "P" of Figure 9, the plug is connected to the thimble of the plate 127, being a "P. M." thimble. It is thus evident that by moving the plug into either of the three operative positions, "N," "O" and "P" of Figure 9, selection can be made for the particular time element of the programming, as to whether the station which is connected to the circular conductor corresponding to the thimble 132 of the plug in question shall be brought into tune for either "A. M." or "P. M." operation or both "A. M." and "P. M." operations, or whether, by leaving the plug in its "Off" position no station shall be tuned for the particular time interval in question. It is, of course, understood that in Figure 9 all four of the positions indicated at "M," "N," "O" and "P" are for one and the same plug, and not for four different plugs, although all such showings are aligned with each other.

In Figures 14 and 15 we have shown a modified form of the plug type switching means, in which the plug comprises a sheet metal stamping 142, formed with the dwell 143 which will engage with either of the stationary contacts 144 or 145, or with both of said contacts as desired for functions corresponding to the functions already described. In this case the contact 146 is continuously in engagement with the body of the plug, such contact 146 being connected to one of the circular conductors 83ª, 84ª, 85ª or 86ª. Figure 15 shows schematically three radial groups of the plugs, each group including four plugs placed in horizontal alignment for convenience of illustration; and this figure shows the radial conductor of either of the plates 126 or 127 which serves the four plugs of each group, such conductor being shown at 147. This figure shows how, when using plugs formed of sheet metal stampings it is possible to alternate the directions in which the faces of the plugs are set into the plate 126 or 127, as the case may be, with corresponding alternation of the positions of the contacts 144 and 145, for purposes of compactness of design and construction of the device.

In Figure 16 we have shown another modified form of switching element which may be used in place of the plug type switching elements already described. In the present case we provide a circularly located set of five contacts, 148, 149, 150, 151 and 152, and a centrally located rotatable contact 153, provided with the finger piece 154 by which it may be rotated. This contact 153 is connected to one of the contacts 70 or 71 of the time selector, and the four contacts 149, 150, 151 and 152 are connected to the four circular conductors 83ª, 84ª, 85ª and 86ª, respectively. Accordingly, by turning the contact 153 to the "Off" position, that time element of the program corresponding to the contact 70 or 71 which is connected to the contact 153 will not tune any station for such time element or interval. Then, by turning the contact 153 to engage a selected one of the four contacts 149, 150, 151 or 152, connection will be established with that circular conductor corresponding to such contact, and thus connection will be established to bring in the desired station for the time element or interval of the program.

In Figure 13 we have shown a convenient construction of the connections between the shaft 20 and the swinging arm 35, the manual tuning button, and the segmental rack element 42. In this construction we provide a collar 155 of insulating material such as plastic, which collar conveniently has the outwardly extending flange 156. The segmental rack element 42 is set onto this collar with a snug fit of sufficient frictional engagement to ensure reliable drive from the segmental rack to the shaft parts during normal automatic operation. Nevertheless, the shaft may be rotated by manual operation, carrying with it the collar 155, but allowing the segmental rack to remain unrotated. A ring of plastic or other suitable material, 157 is set onto the collar beyond the segmental rack, and is cemented to the collar.

The swinging arm 35 is connected to the hub element 158 which hub element is set onto the shaft 20; and a pin 159 is extended through the hub element 158, the collar 155, and the shaft to lock these parts together. The manual tuning button 160 is set onto the shaft and locked thereto by the set screw 161 in familiar manner. It will now be seen that during normal automatic control by drive from the segmental rack 42 as previously explained herein, the shaft and swinging arm, and the manual button, all rock together under such automatic drive. It is, however, evident that by application to the button 160 of a sufficient manual force it is possible to rock the shaft to any tunable position, the collar 155 slipping within the segmental rack. It is here noted that due to the worm and worm gear drive from the motor shaft to the link 46, it would not be feasible to effect manual drive without provision for the slip connection just referred to; and in fact it would be impossible to effect such manual drive in any case where the worm to worm gear drive was "irreversible" as is generally the case.

It is to be emphasized, however, that the arrangement shown in Figure 13 is one in which the arm 35 always retains a fixed position with respect to the shaft 20, due to the cross pin 159. This is generally necessary in order to secure proper synchronization between the several tuning elements. It is of course necessary when the arm 35 is to be used as a contact carrier during the automatic tuning, since during such tuning the contact element 36 (or 100 in Figure 12) must be retained in a definitely established angular relationship to the shaft 20 by which the tuning is actually produced.

It may be here noted that in the arrangements shown in Figures 1, 2, 3, 4, and 5 we have disclosed means in the form of switching elements whereby a selected few (for example, four) stations may be pre-selected from a larger number, for example seven, stations, in order to accommodate the selections to the limitation of four stations which may be time-controlled. It is noted, however, that with the arrangement shown in Figures 12 and 13, wherein we have shown four contacts 94, 95, 96 and 97 which may be individually adjusted around the circular support and locked in their several adjusted positions, it is possible to effect the selection of such four stations to be automatically tuned, from a large number of possible tuning positions. With the arrangement now being discussed the user may change the selection of the four stations from time to time to meet his desires, or according to the commencement or discontinuance of programs at selected portions of the day, and to continuously accommodate the device to his changing wishes from time to time.

We have mentioned that the circular plates or ring shaped elements 126 and 127 are supported by the brackets 130. Conveniently the plate 101 in which the time shaft 63 is journalled and which carries the contacts 70 and 71 may be supported from the plate 162 which is also in turn supported by the brackets 130. For this purpose the small brackets 163 are shown extending between said plate 162 and the plate 101. Thus all of the contact carrying plates are held in proper positions relative to each other and by a simple construction.

Since the time shaft 63 rotates once each twelve hours it is evident that the time lapse needed for the contact 112 carried by the outer end of the arm 68ª (see Figures 6 and 7) to pass over the gap between successive contacts 70 (or 71) may be several seconds or even a substantial portion of a minute. If in such operation of passing the contact 112 from one of the contacts 70 (or 71) to the next contact of such series the circuit should be opened at the location of such contact 112 it is evident that delivery of blocking potential to the grid 55 of the tube 52 would be halted during the interval of such open circuit condition. Accordingly, the motor operation would commence and continue during the interval of such open circuit condition; and that interval might, as above suggested, be of a duration sufficient to cause the motor to swing the arm 35 needlessly back and forth for several swings. Accordingly we prefer to so form the contact 112 that it will always overlap from one contact 70 (or 71) to the next contact of the series, thus ensuring against any such undesired circuit opening operation. Such overlapping design is not objectionable from the standpoint of interference with correct functioning of the station selecting operations for the following reasons:

If it should happen that the next time interval of the programming required the same station to be tuned as was in tune during the interval just terminating (as when the particular program under tune extended for more than fifteen minutes), it is evident that the contact 70 (or 71) next in order to be engaged by the contact 112 would be connected to the same station contact 28 or 34 as was previously being used, and therefore no change of tuning would be required under the assumed conditions. Consequently the overlap would not in such case interfere with correct functioning, as no change of tuning was required. On the other hand, at the instant that the contact 112 leaves any one of the contacts 70 (or 71), thus de-electrifying the corresponding contact 28 to 34, motor operation will commence in normal fashion; since as yet the arm 35 and contact 36 have not come to engage the new one of the contacts 28 to 34. Then, when the correct one of such contacts 28 to 34 is reached during the normal swing of the arm 35 and its contact 36, the contact 112 will already be in engagement with the next contact 70 (or 71), thus electrifying the proper one of the contact 28 to 34 to ensure correct stoppage at the station next to be tuned according to the program which has been set up.

If, however, it should happen that the program so set up included a time gap between two of the time intervals (of fifteen minutes, for example), it is evident that the switching devices (such as the plugs) would be in the "Off" position for such time interval. Accordingly, no one of the contacts 28 to 34 would now be electrified for such time interval, and accordingly, there would be no blocking of the tube 52 and no discontinuance of motor operation as long as such condition continued to exist. Under these conditions the user should open the switch 54 at such times, thus bringing the automatic operation to a close for the time being.

Reference has been made to the provision of manual control by means of the button 160 on the shaft 20. When such manual control is resorted to, either during the duration of a program which has been set up for automatic operation, or otherwise, the switch 54 should be opened. Otherwise, as soon as the shaft 20 was manually rocked from its automatically tuned position to some other position, the motor would commence operation in an effort to restore the said shaft to its position of rock as indicated by the program set-up then in force. It is also noted that when such a manual tuning operation has been effected by the button 160, the angular position of the shaft 20 has been changed with respect to the angular position of the worm 42, so that in the absence of corrective provision future automatic tuning operations might not properly occur. We have made provision against this condition as follows:

In Figures 5 and 12 we have shown the stop pins 164 and 165 supported at positions to limit the swinging travel of the arm 35 in both directions, and these pins are set at such locations that these limits of swing of said arm 35 are the same as the swing limits which occur under normal automatic tuning operations. Then the following condition will obtain:

Assuming that, after an automatic operation the user should resort to manual operation, and for this purpose rock the arm clockwise from its position as determined by the previous automatic operation. This would displace the arm clockwise from its true position by the amount of such manual rock. Then, assuming that automatic operation is instituted; when, during the first rock clockwise by such automatic operation, the arm 35 should come into engagement with the right-hand stop 164 further swing of such arm would be arrested, but the motor drive of the gear element 42 would continue (with slip of such gear element on the collar 155 as already explained). Such slip would continue until the clockwise rock of the gear element reached its terminus due to reversal of direction of movement of the link 46, and thereupon the arm 35 would commence to rock counterclockwise with the gear element 42 and would thereafter function correctly and in phase with the gear's rocks. Thus the temporary angular displacement would be corrected, and no harm would remain.

We have referred to the ability to incorporate the features of the present invention into receivers of the "push-button" type, that is, the fixed tuning position type. To do this the following expedients may be availed of:

Each of the contacts 28 to 34 may be connected to the impedance element circuits of the receiver in question in such manner that whenever one of such contacts is electrified that impedance element will be brought into tuning condition in such "push-button" receiver. Then, when the swing of the arm 35 at a given station is arrested according to the functions already set forth herein, such one of the contacts 28 to 34 will be under electrification, thus retaining the receiver in tune at the corresponding station frequency as long as such contact 28 to 34 remains electrified.

Since the shaft 63 is an "hour" shaft, completing one revolution in twelve hours and therefore corresponding to the hour shaft of a conventional time-piece, we have, in Figure 7 shown said shaft as carried forwardly through the plate 131, and as being provided with the hour hand 166 which hour hand may be read in comparison to the hour markings 167 shown on the face of the plate 131 in Figures 1, 2, 3, and 4.

Likewise, since the shaft 20 is a "tuning" shaft and assumes an angular position corresponding to the tuning position at any given time, we have carried this shaft out through the front plate 131 and have provided the tuning indication pointer 168 thereon, which pointer may be read in comparison to the station markings 169 shown in Figures 1, 2, 3, 4, and 5. The manual tuning knob or button 160 is also mounted on the externally projecting portion of this shaft as shown in said figures.

We claim:

1. The combination with the rock shaft of the station tuning element of a radio receiver or the like, of means to rock said shaft to pre-selected station tuning positions of rock during successive preselected time lapse intervals, said means including a unidirectional rotation motor element, a driving connection from the motor element to the rock shaft including means to rock the shaft back and forth between upper and lower tuning positions of rock with unidirectional motor rotation, a contact movable along a path of travel, a group of stationary contacts located in successive positions along the path of travel of the movable contact, means in connection with the rock shaft rocking means to move said movable contact back and forth along said path of travel between extreme limits of movement including all of the stationary contacts with said unidirectional motor rotation, operator selective means to individually electrify preselected contacts of the group of stationary contacts during preselected time intervals and according to a preselected sequence, means to normally supply current to the motor element for continuous unidirectional operation of said motor element, and means to discontinue such supply of current to said motor element during intervals while the movable contact is in engagement with any electrified stationary contact and to cause supply of current to the motor element during intervals while the movable contact is not in engagement with any electrified stationary contact.

2. Means as defined in claim 1, wherein the means to discontinue supply of current to the motor element includes means to make effective said discontinuing means only during movement of the movable contact in one direction along said path of travel.

3. Means as defined in claim 1, wherein the path of travel of the movable contact comprises a circular arc, and wherein the stationary contacts are located at successive positions along said circular arc.

4. Means as defined in claim 3, wherein the means which is in connection with the rock shaft rocking means to move the movable contact back and forth along said path of travel comprises an arm mounted for rocking movement about an axis coincident with the axis of the station tuning element shaft.

5. Means as defined in claim 1, together with a manually operable element in driving engagement with the rock shaft, and wherein the driving connection from the motor element to the rock shaft includes a friction drive element, said friction drive element being constituted to permit manual rotation of the shaft by said manually operable element without rotation of the motor element.

6. Means as defined in claim 1, wherein the driving connection from the motor element to the rock shaft includes a segmental gear in driving connection with the rock shaft, another segmental gear meshing with the segmental gear first mentioned, a journal mounting for the second mentioned segmental gear, a crank, a journal mounting for the crank, a unidirectional drive from the motor element to the crank, a link, a pivotal connection between one end of the link and the crank, and a pivotal connection between the other end of the link and the second mentioned segmental gear, said last mentioned pivotal connection being located at a radial distance from the journal axis of the second mentioned segmental gear greater than the radial dimension of the crank.

7. Means as defined in claim 1, wherein the means to discontinue supply of current to the motor element includes means to make effective said discontinuing means only during movement of the movable contact in one direction along said path of travel.

8. Means as defined in claim 1, wherein the means to normally supply current to the motor element includes a circuit and includes a control element for said circuit, said control element comprising a three electrode tube, and in which the plate and the cathode of such tube comprise portions of the motor control circuit, and in which the operator selective stationary contact pre-electrifying means includes means to deliver to said contacts a potential of tube blocking value, together with connections between the movable contact and the grid of such tube.

References Cited in the file of this patent

UNITED STATES PATENTS

| | | |
|---|---|---|
| 1,911,021 | Gunther et al. | May 23, 1933 |
| 2,337,568 | Owens | Dec. 28, 1943 |
| 2,342,814 | Miller | Feb. 29, 1944 |
| 2,346,623 | Stewart et al. | Apr. 11, 1944 |
| 2,574,097 | Foster | Nov. 6, 1951 |